United States Patent
Chen

(10) Patent No.: US 8,606,513 B2
(45) Date of Patent: Dec. 10, 2013

(54) METHOD AND SYSTEM FOR POWER MANAGEMENT IN A HYBRID ELECTRIC VEHICLE

(75) Inventor: Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 60 days.

(21) Appl. No.: 13/333,701

(22) Filed: Dec. 21, 2011

(65) Prior Publication Data

US 2013/0166116 A1    Jun. 27, 2013

(51) Int. Cl.
*G01C 21/00* (2006.01)

(52) U.S. Cl.
USPC ............................. 701/423; 701/22; 701/424

(58) Field of Classification Search
USPC .......................................... 701/22, 424, 423
See application file for complete search history.

(56) References Cited

U.S. PATENT DOCUMENTS

| | | | | |
|---|---|---|---|---|
| 7,774,109 B2* | 8/2010 | Bajwa | ............................. | 701/22 |
| 2002/0107618 A1* | 8/2002 | Deguchi et al. | ................ | 701/22 |
| 2009/0150016 A1* | 6/2009 | Hung et al. | ...................... | 701/22 |
| 2009/0259355 A1* | 10/2009 | Li | ..................... | 701/22 |
| 2009/0259363 A1 | 10/2009 | Li et al. | ........................... | 701/36 |
| 2011/0022255 A1* | 1/2011 | Yamada et al. | .................. | 701/22 |
| 2011/0066310 A1* | 3/2011 | Sakai et al. | ..................... | 701/22 |
| 2011/0264317 A1* | 10/2011 | Druenert et al. | ................ | 701/22 |
| 2012/0010767 A1* | 1/2012 | Phillips et al. | .................. | 701/22 |
| 2012/0010768 A1* | 1/2012 | Phillips et al. | .................. | 701/22 |
| 2012/0035795 A1* | 2/2012 | Yu et al. | .......................... | 701/22 |
| 2012/0109515 A1* | 5/2012 | Uyeki et al. | ................... | 701/423 |
| 2012/0310471 A1* | 12/2012 | Sengoku et al. | ............. | 701/31.5 |
| 2013/0002188 A1* | 1/2013 | Uyeki | ........................... | 320/101 |

* cited by examiner

*Primary Examiner* — Hussein A. Elchanti
(74) *Attorney, Agent, or Firm* — Baker Botts L.L.P.

(57) ABSTRACT

In accordance with some embodiments of the present disclosure, a method may include recording trip information associated with a vehicle, the trip information including parameters associated with previous trips taken by the vehicle. The method may also include a first portion of power to be delivered by an electric motor and a second portion of power to be delivered by an engine configured to convert chemical energy to mechanical energy for driving one or more components of the vehicle based at least on the trip information and a state of charge of an energy storage device configured to provide electrical energy to a electric motor configured to convert electrical energy to mechanical energy for driving one or more components of the vehicle.

19 Claims, 5 Drawing Sheets

METHOD AND SYSTEM FOR POWER MANAGEMENT IN A HYBRID ELECTRIC VEHICLE

TECHNICAL FIELD

The present disclosure relates generally to hybrid electric vehicles, more particularly, to power management of hybrid electric vehicles, including plug-in hybrid electric vehicles.

BACKGROUND

Due to increased environmental consciousness and political and economic concerns associated with the importation of foreign petroleum products, electric vehicles, including hybrid electric vehicles have been increasingly used as alternatives to traditional internal combustion engine vehicles. In general, a hybrid electric vehicle (HEV) is a vehicle that uses two or more distinct power sources to drive the vehicle: an internal combustion engine (ICE) and one or more electric motors powered by one or more batteries. One type of HEV is commonly referred to a plug-in hybrid electric vehicle (PHEV), in which batteries that supply power to electric motors are configured to be coupled to an electricity supply (e.g., a public power grid) when the vehicle is not in use, thus permitting batteries to be recharged between vehicle uses. PHEVs often include control systems that, according to a particular algorithm or setting, determine the portion of driving power supplied by each of the ICE and the electric motor.

SUMMARY

In accordance with some embodiments of the present disclosure, a method may include recording historical trip information associated with a vehicle, the historical information including parameters associated with previous trips taken by the vehicle. Based at least on the historical trip information and a state of charge of an energy storage device configured to provide electrical energy to a electric motor configured to convert electrical energy to mechanical energy for driving one or more components of the vehicle, a first portion of power to be delivered by an electric motor and a second portion of power to be delivered by an internal combustion engine configured to convert chemical energy to mechanical energy for driving one or more components of the vehicle may be determined.

Technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
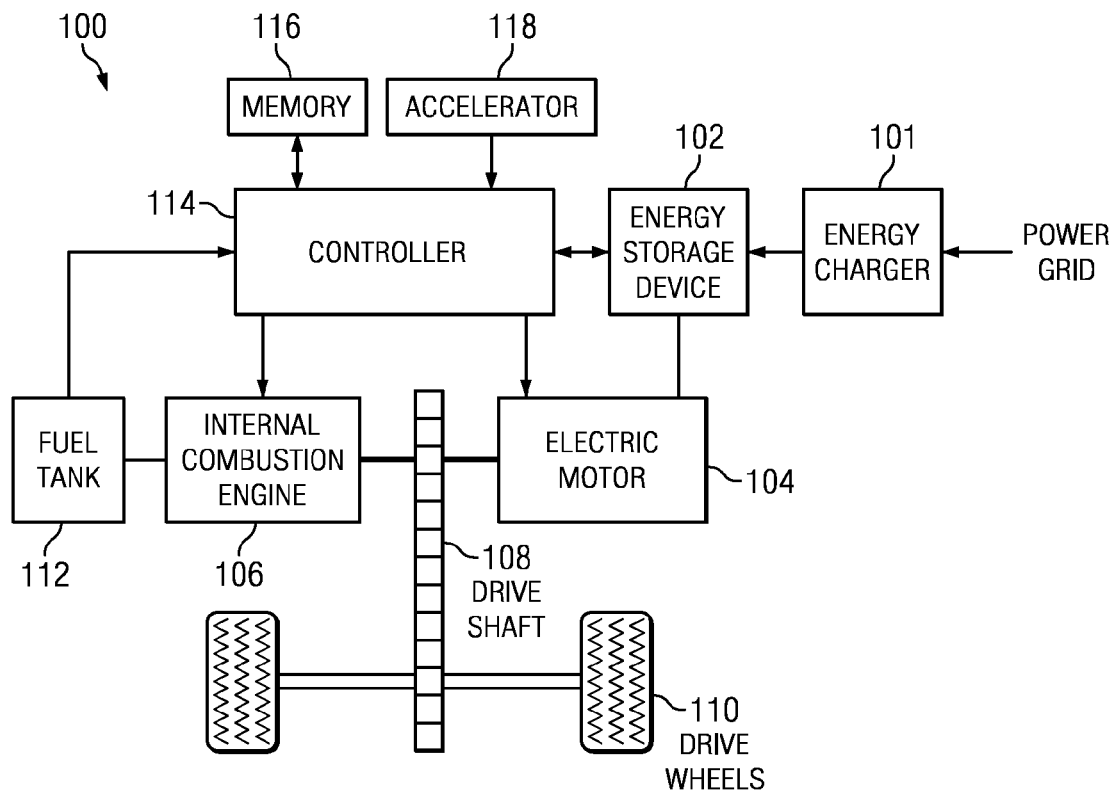
FIG. 1 illustrates a block diagram of selected components of an example plug-in hybrid electric vehicle, in accordance with embodiments of the present disclosure.

FIG. 1 illustrates a block diagram of selected components of an example plug-in hybrid electric vehicle (PHEV) 100, in accordance with embodiments of the present disclosure. Vehicle 100 may broadly represent any system, device, or apparatus configured or used to transport persons and/or cargo in whole or in part on land, including without limitation a passenger automobile (e.g., a car, truck, sport utility vehicle, van, bus, motorcycle, coach, etc.), a train, a trolley, an aircraft, a spacecraft, an amphibious watercraft, industrial equipment (e.g., a forklift, cart, etc.), and/or any other suitable vehicle. As depicted in FIG. 1, vehicle 100 may include an energy charger 101, an energy storage device 102, an electric motor 104, an internal combustion engine 106, a drive shaft 108, drive wheels 110, fuel tank 112, controller 114, memory 116, and an accelerator 118.

Energy charger 101 may include any suitable conduit or aggregation of conduits configured to transfer energy from a power grid or other source of energy to energy storage device 102. For example, energy charger 101 may include a plug configured to electrically couple to a public power grid and/or one or more wires for electrically coupling the plug to energy storage device 102.

Energy storage device 102 may be electrically coupled to electric motor 104, controller 114 and/or one or more other components of vehicle 100 and may include any device that may store potential energy which may be utilized to operate vehicle 100 and is capable of receiving and storing energy delivered to it from another energy source (e.g., via energy charger 101). For example, energy storage device 102 may include a rechargeable electrochemical battery, a fuel cell, a flywheel, hydraulic accumulator, mechanical spring, supercapacitor, and/or any other element operable to store potential energy.

Electric motor 104 may be electrically coupled to energy storage device 102, controller 114, and/or one or more other components of vehicle 100 and/or mechanically coupled to drive shaft 108 and/or one or more other components of vehicle 100. Electric motor 104 may be any system, device, or apparatus configured to convert electrical energy (e.g., energy delivered from energy storage device 122) to mechanical energy for driving drive shaft 108, drive wheels 110 and/or other components of vehicle 100.

Internal combustion engine 106 may be electrically coupled to controller 114 and/or one or more other components of vehicle 100, fluidically coupled to fuel tank 112 and/or one or more other components of vehicle 100, and/or mechanically coupled to drive shaft 108 and/or one or more other components of vehicle 100. Internal combustion engine 108 may be any system, device, or apparatus configured to covert chemical energy (e.g., stored in a fuel present in fuel tank 112) mechanical energy for driving drive shaft 108, drive wheels 110 and/or other components of vehicle 100.

Drive shaft 108 may be mechanically coupled to electric motor 104, internal combustion engine 106, drive wheels 110, and/or other components of vehicle 100. Drive shaft 108 may be any system, device, or apparatus configured to transmit torque and/or rotation imparted upon drive shaft by electric motor 104 and/or internal combustion engine 106 to drive wheels 110.

Drive wheels 110 may be mechanically coupled to drive shaft 108, and may be any system, device, or apparatus configured receive torque from drive shaft 108 to provide a driving force to propel vehicle 100 (e.g., via a roadway).

Fuel tank 112 may be fluidically coupled to internal combustion engine 106, and may be any system, device, or apparatus configured to contain a fuel (e.g., gasoline) for combustion by internal combustion engine 106.

Controller 114 may be electrically coupled to memory 116, accelerator 118, fuel tank 112, energy storage device 102, electric motor 104, internal combustion engine 106, and/or other components of vehicle 100. Controller 114 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 114 may interpret and/or execute program instructions and/or process data stored in memory 116 and/or another component of vehicle 100. In operation, controller 114 may receive from and/or communicate to other components of vehicle 100 in order to control the operation of vehicle 100, including control of a power split ratio (PSR) between electric motor 104 and internal combustion engine 106, as described in greater detail below.

Memory 116 may be electrically coupled to controller 114 and may include any system, device, or apparatus configured to retain program instructions and/or data for a period of time (e.g., computer-readable media). Memory 116 may include random access memory (RAM), electrically erasable programmable read-only memory (EEPROM), a PCMCIA card, flash memory, magnetic storage, opto-magnetic storage, or any suitable selection and/or array of volatile or non-volatile memory. In certain embodiments, memory 116 may store navigation information, route information, traffic information, energy price information, historical trip information, driver information, and/or other information.

Accelerator 118 may be in communication with controller 114 and/or other components of vehicle 100. Accelerator 118 may include any actuator (e.g., a pedal) that may be actuated by a user (e.g., a driver of vehicle 100) to indicate a desired speed of travel.

In operation, controller 114 may receive information from other components of vehicle 100 and/or other sources of information in order to control the operation of vehicle 100, including control of a PSR between electric motor 104 and internal combustion engine 106.

Figure 2:
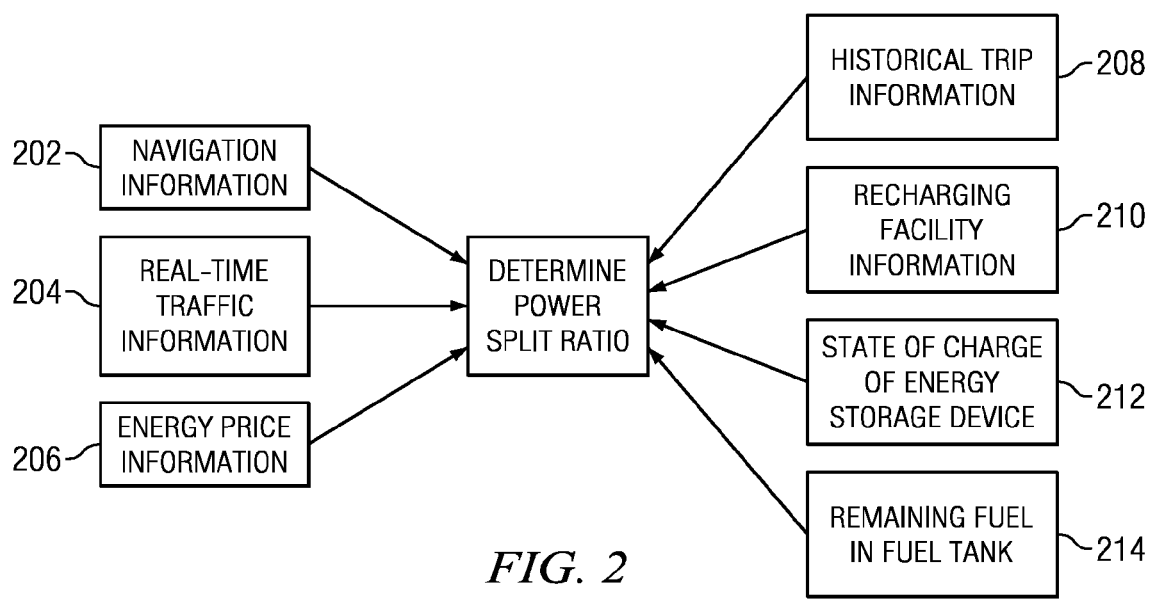
FIG. 2 illustrates a diagram depicting example items of information that may be considered in determining a power split ratio in a plug-in hybrid electric vehicle, in accordance with embodiments of the present disclosure.

FIG. 2 illustrates a diagram depicting example items of information that may be considered (e.g., by controller 114) in determining a power split ratio in a plug-in hybrid electric vehicle, in accordance with embodiments of the present disclosure. As shown in FIG. 2, examples of information upon which a power-split ratio may be based include navigation information 202, real-time traffic information 204, energy price information 206, historical trip information 208, Recharging facility information 210, a state of charge of energy storage device 102, a remaining amount of fuel in fuel tank 112, and/or other information.

Navigation information 202 may be stored in memory 116 and may include information regarding an expected route of travel for vehicle 100. For example, navigation information 202 may include a graph, map, list, or other data structure indicating a route of travel from a current location or other starting point to an intended destination of the vehicle. In some embodiments, such navigation information 202 may be determined or calculated based on a destination provided by a user and a starting point provided by a user or determined by a present location of vehicle 100 (e.g., based on global positioning system (GPS) capability present in vehicle 100).

Real-time traffic information 204 may include data regarding substantially contemporaneous (e.g., less than one hour old) traffic patterns, congestion, expected travel speed, road construction, road/lane closures, traffic hazards, accidents, disabled vehicles, and/or other relevant data for one or more particular routes of travel. Such real-time traffic information 204 may be received by controller 114 via a communications module (e.g., wireless/cellular communications receiver, frequency modulation (FM) receiver, etc.) integral to vehicle 100.

Energy price information 206 may include information regarding prevailing prices for fuel and/or electrical energy. Such energy price information 206 may be received by controller 114 via a communications module (e.g., wireless/cellular communications receiver, frequency modulation (FM) receiver, etc.) integral to vehicle 100 and/or may be stored in memory 116. Such information may be communicated from any source, including without limitation a public utility company, charging station, refueling station, the Internet, and/or any other suitable source.

Historical trip information 208 may be stored in memory 116 and include, for a particular trip of a vehicle (e.g., a previous trip from a starting point to a destination), one or more parameters associated with vehicle 100 during such trip. For example, such parameters may include vehicle velocity as a function as time, total demanded power of vehicle 100 as a function of time, power supplied from electric motor 104 as a function of time, power supplied from internal combustion engine 106 as a function of time, location of a vehicle as a function of time, and the time of travel. Such parameters may be sampled at any suitable sampling rate during a trip. Historical trip information 208 may also include statistical information regarding one or more previous trips of vehicle 100. For example, historical trip information 208 may calculate mean, median, and/or other statistical data for different classifications of trips, wherein a classification may include trips having similar or identical travel conditions (e.g., one or more of a route, traffic conditions, time of day, day of week, and/or other suitable variables that might effect performance of vehicle 100 and its components). Thus, as a specific example, a classification may include a particular route for a particular time of day given particular traffic conditions, and historical trip information 208 may include, for such classification, statistics including mean and/or median vehicle velocities, demanded powers, powers supplied by electric motor 104 and internal combustion engine 106, location, and/or other statistics related to trips with such classification. Other examples of information that may be included in historical trip information 208 may be provided elsewhere in this disclosure.

Recharging facility information 210 may include a database and/or other data structure setting forth a location (e.g., geographical coordinates) of recharging facilities in which a user may recharge energy storage device 102. In some embodiments, location of recharging facilities 210 may also include information regarding prices associated with recharging at such facilities, historical charging start times and stop times of recharging operations of vehicle 100 at such facilities, charging speeds, average state of charge of energy storage device 102 at the conclusion of charging operations, etc. Recharging facility information 210 may be input manually by a user of vehicle 100, received via a communications module (e.g., wireless/cellular communications receiver, frequency modulation (FM) receiver, etc.) integral to vehicle 100, and/or a combination thereof. In some embodiments, recharging facility information 210 may be integrated with navigation information 202.

State of charge of energy storage device 212 may include any data indicative of energy remaining in energy storage device 102 (e.g., a percentage of maximum energy capacity; an absolute amount of energy remaining in joules, kilowatt-hours, or other unit; or other suitable indicator). State of charge of energy storage device 212 may be communicated to controller 114 from energy storage device 102.

Remaining fuel in fuel tank 214 may include any data indicative of fuel remaining in fuel tank 112 (e.g., a percentage of maximum fuel capacity in fuel tank 112; an absolute amount of fuel remaining in gallons, liters, or other unit; or other suitable unit; or other suitable indicator). Remaining fuel in fuel tank 214 may be communication to controller 114 from fuel tank 112.

Figure 3:
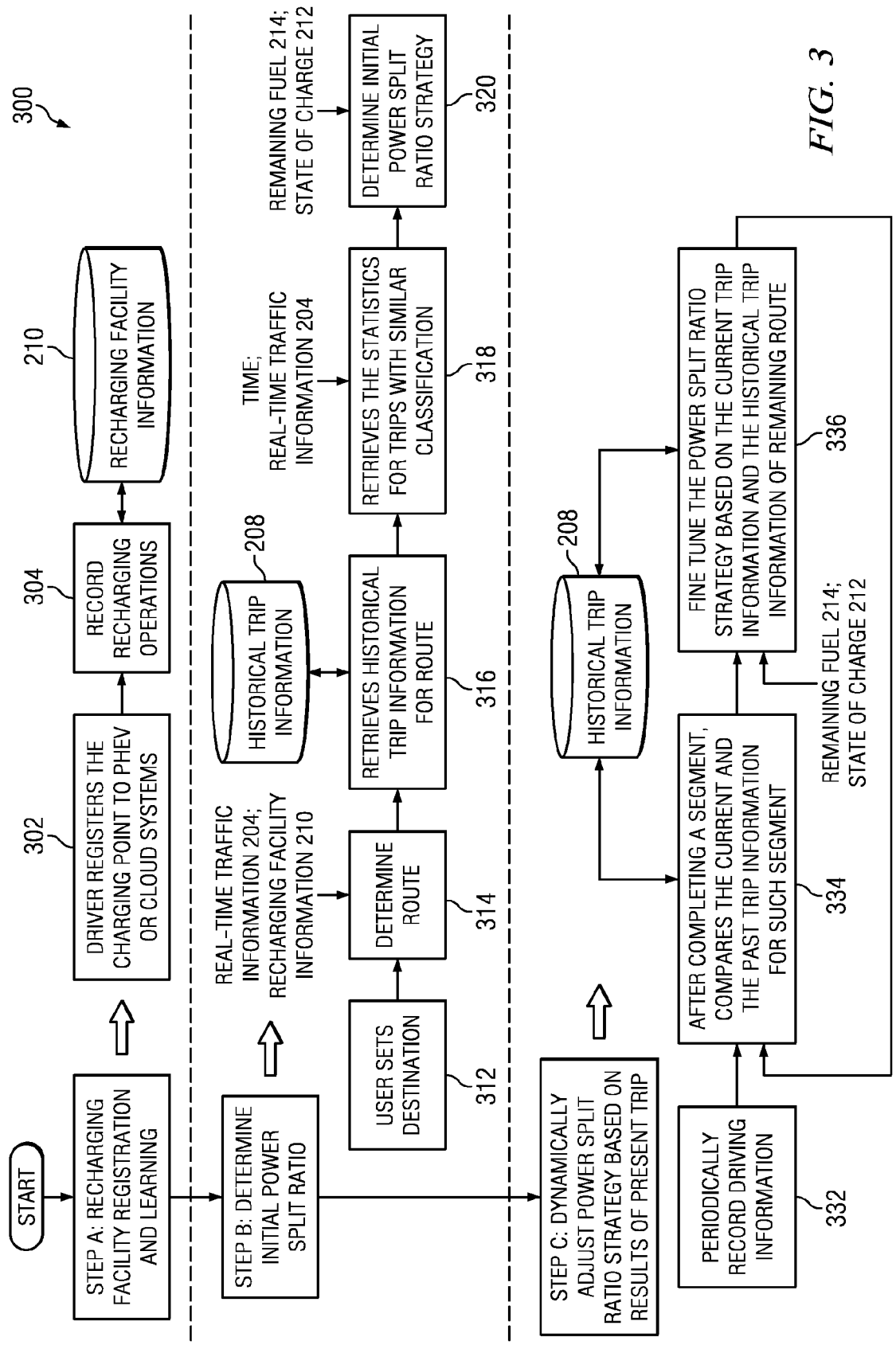
FIG. 3 illustrates flow charts of an example method of managing power in a hybrid-electric vehicle, in accordance with embodiments of the present disclosure.

FIG. 3 illustrates flow charts of an example method 300 of managing power in a hybrid-electric vehicle, in accordance with embodiments of the present disclosure. Method 300 may be performed at least in part by controller 114, and/or one or more other components vehicle 100. According to one embodiment, method 300 may comprise steps A, B, and C, as shown in FIG. 3. Further as shown in FIG. 3, step A may comprise sub-steps 302 and 304, step B may comprise sub-steps 312-320, and Step C may comprise sub-steps 332-336. As noted above, teachings of the present disclosure may be implemented in a variety of configurations of vehicle 100. As such, the preferred initialization point for method 300 and the order of the steps A, B, C and sub-steps 302-336 comprising method 300 may depend on the implementation chosen.

In step A, a user (e.g., driver) may register commonly used recharging facilities to recharging facility information 210 within memory 116 and/or to a network (e.g., the Internet) accessible to vehicle 100 (e.g., via a communications module), as indicated by sub-step 302. In these and other embodiments, some of information in recharging facility information 210 may be obtained from the Internet or other source and automatically populated within recharging facility information 210. At sub-step 304, controller 114 and/or another component of vehicle 100 may record information associated with recharging operations and store such information within recharging facility information 210. Information included in recharging facility information 210 may include locations (e.g., geographical coordinates) of charging points, prices associated with recharging at the recharging facility, historical charging start times and stop times of recharging operations of vehicle 100 at such facilities, charging speeds, average state of charge of energy storage device 102 at the conclusion of charging operations, etc.

As a result of step A, vehicle 100 may "learn" locations where energy storage device 102 may be recharged including price and other information regarding such locations, thus allowing controller 114 to make intelligent decisions regarding a power split ratio based on the state of charge of energy storage device 102 and the distance to potential charging points. For example, in situations in which electricity is less expensive than gasoline, controller 114 may adopt a strategy such that fuel consumption is minimized, thus preferring to use as much energy from energy storage device 102 before reaching a charging point. In some embodiments, relevant information such as, for example, information regarding fuel/electricity price, recommended recharging facility/refuel station(s), a proposed strategy for power management of vehicle 100, and/or other information may be provided to a user by controller 114 (e.g., by a suitable user interface of vehicle 100), such that the user may (e.g., through the user interface) convey a desired power management strategy to controller 114.

In step B, controller 114 and/or other components of vehicle 100 may, based on one or more sources of information, determine an initial power split ratio strategy between electric motor 104 and internal combustion engine 106. At sub-step 312, a user may interface with controller 114 to set a desired destination. At sub-step 314, controller 114 and/or other components of vehicle 100 may, based at least on the desired destination real-time traffic information 204, recharging facility information 210, and/or other information, determine a route to the desired destination. At sub-step 316, controller 114 and/or other components of vehicle 100 may retrieve from historical trip information 208 information related to the determined route. At sub-step 318, controller 114 and/or other components of vehicle 100 may, based at least on the time of day, day of week, real-time traffic data, the determined route, and/or other information, determine a classification for the present trip and retrieve statistics for trips with a similar classification. At sub-step 320, controller 114 and/or other components of vehicle 100 may, based at least on the statistics for trips with the similar classification, state of charge of energy storage device 212, remaining fuel in fuel tank 214, and/or other information, determine an initial power split ratio strategy for vehicle 100.

Although any suitable calculation or calculations may be utilized to determine an initial power split ratio strategy, examples of determining the initial power split ratio strategy are discussed briefly below. As described above, power split ratio may be based on any number of instant measurements, including without limitation demanded power of the vehicle ($p_D$), vehicle velocity (v), vehicle acceleration, etc. Control of the power split ratio may further be based on statistics of similar past trips (e.g., trips with similar classification to the present trip), remaining state of charge of energy storage device 102, fuel economy, etc. Statistics used to calculate the power split ratio may in some embodiments include histogram statistics of similar past trips, as described below.

Although power split ratio strategy may be based on any number of different instant measurements, determination of strategy based on a single type of instant measurement (one-dimensional) and two types of instant measurements (two-dimensional) are described as example for purposes of illustration and exposition. In a one-dimensional case, power split ratio may be based on instant demanded power for vehicle 100 (e.g., based on driver actuation of accelerator 118 and/or other power demands). To illustrate a one-dimensional example, reference is made to FIG. 4, which depicts an example histogram for a trip. Such a histogram may be retrieved, for example, at sub-step 318 of method 300, in which statistics for trips of a similar classification of a present trip are retrieved, and thus, such a histogram may be representative of historical data for trips of a particular classification. In the histogram depicted in FIG. 4, the horizontal axis represents demanded power $p_D$ for M different multiples of units of power $p_b$, while the vertical axis represents a number of time samples for which a particular power amount was demanded, and thus is indicative of the amount of time (e.g., an average amount of time based on one or more previous trips) during a trip that each power level along the horizontal axis is demanded.

Figure 4:
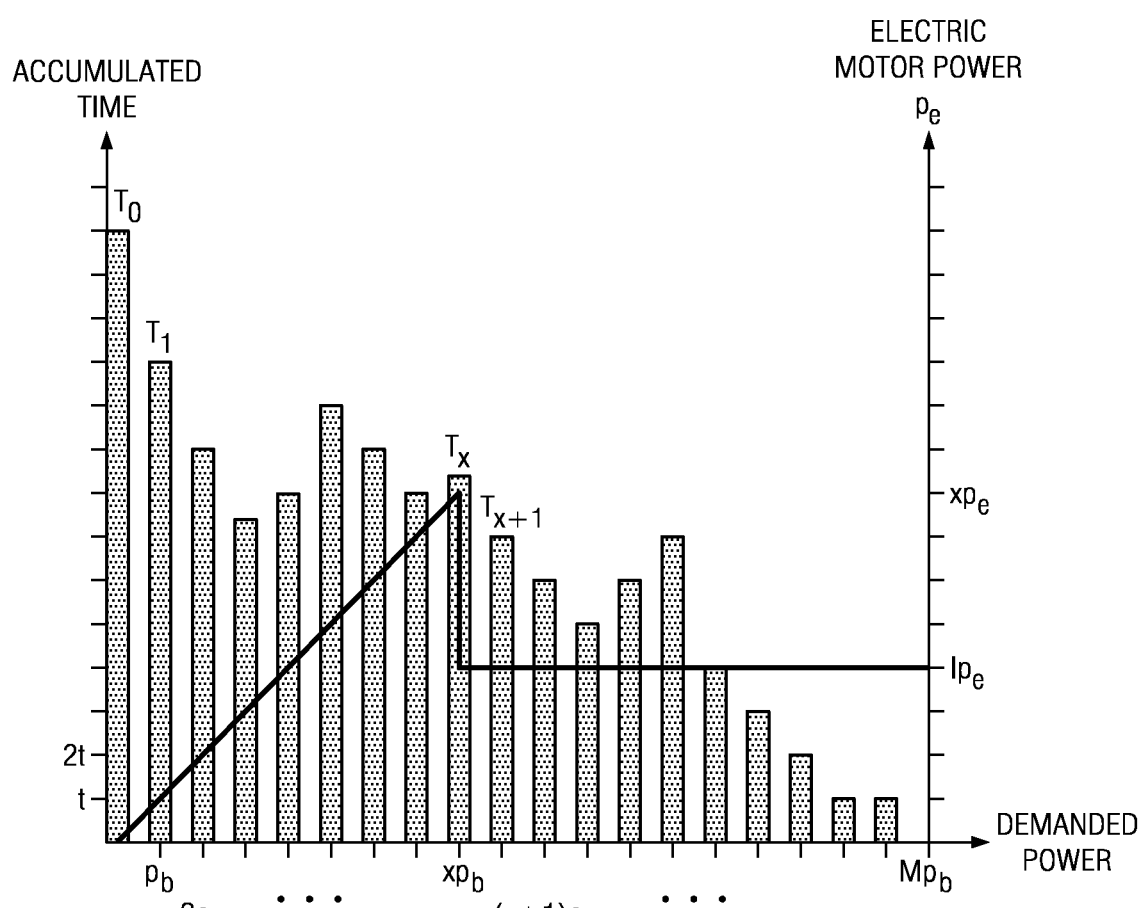
FIG. 4 illustrates an example histogram and an example function for a power split ratio for a one-dimensional power split ratio calculation, in accordance with embodiments of the present disclosure.

A power split ratio strategy based on instant demanded power may be defined by a function depicted with bold line segments overlaying the histogram in FIG. 4 and given by the formula:

$$p_e = p_D$$

for $$p_D \leq x \cdot p_b$$

$$p_e = l \cdot p_b$$

for $$p_D > x \cdot p_b$$

where $p_D$ is an input representing an instant demanded power for vehicle 100 (e.g., based on driver actuation of accelerator 118 and/or other power demands), $p_e$ is an output representing power delivered by electric motor 104, and $p_b$ is an arbitrary unit of power. To set a power split ratio strategy, controller 114 and/or other components of vehicle 100 may determine the values of x and l, which may be determined based on the remaining state of charge of energy storage device 102. For a given value of each of x and l and a given histogram such as that depicted in FIG. 4, the energy expected to be consumed for a trip may be given by:

$$E = \left( P_{min} \cdot \sum_{i=0}^{M} T_i \right) + \left( \sum_{i=0}^{x} i \cdot P_b \cdot T_i \right) + \left( l \cdot P_b \cdot \sum_{i=x+1}^{M} T_i \right)$$

where $T_i$ is the total time interval (e.g., the magnitude in the histogram) for the demanded power $i \cdot p_b$ and M is the magnitude of maximum demanded power. The feasible set of the values of x and l depends on the remaining battery energy and may meet the following inequality:

$$(x, l) \in F(x, l) \text{ such that } \left( P_{min} \cdot \sum_{i=0}^{M} T_i \right) +$$

$$\left( \sum_{i=0}^{x} i \cdot P_b \cdot T_i \right) + \left( l \cdot P_b \cdot \sum_{i=x+1}^{M} T_i \right) < SOC \text{ and } x \geq l$$

A strategy to determine the values of x and l may be to select the combination from the feasible set so as to generate power most from electric motor 104, as given by:

$$(x, l) = \underset{(x,l) \in F(x,l)}{SUP} \left( P_{min} \cdot \sum_{i=0}^{M} T_i \right) + \left( \sum_{i=0}^{x} i \cdot P_b \cdot T_i \right) + \left( l \cdot P_b \cdot \sum_{i=x+1}^{M} T_i \right)$$

Figure 5:
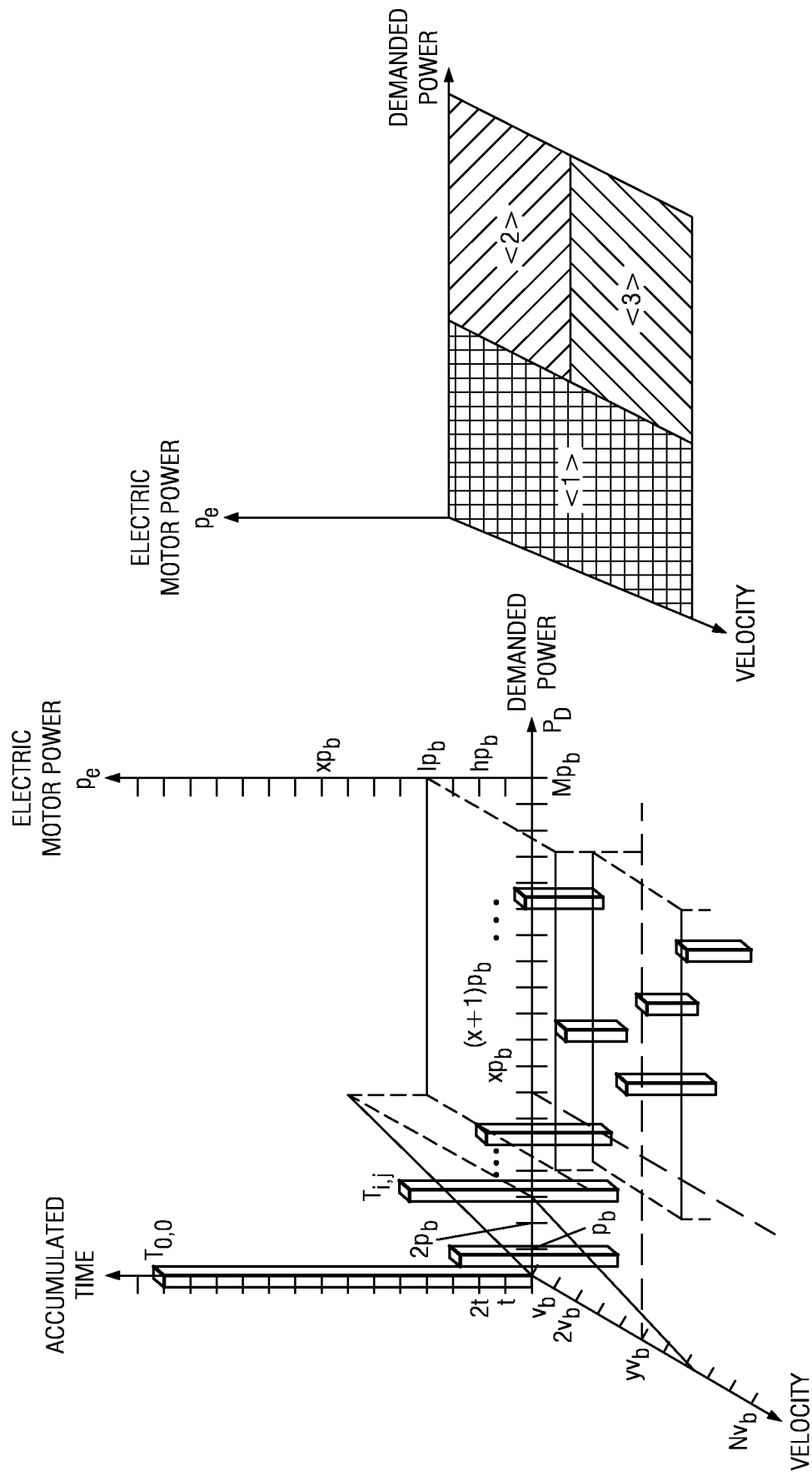
FIG. 5 illustrates an example histogram and an example function for a power split ratio for a two-dimensional power split ratio calculation, in accordance with embodiments of the present disclosure.

To illustrate a two-dimensional example, reference is made to FIG. 5, which depicts another example histogram for a trip. Such a histogram may be retrieved, for example, at sub-step 318 of method 300, in which statistics for trips of a similar classification of a present trip are retrieved, and thus, such a histogram may be representative of historical data for trips of a particular classification. In the histogram depicted on the left side of FIG. 5, the horizontal axes represent demanded power $p_D$ for M different multiples of units of power $p_b$ and N different multiples of units of velocity $v_b$, while the vertical axes represent a number of time samples for which a particular power amount was demanded for such levels of demanded power and velocities, and thus is indicative of the amount of time (e.g., an average amount of time based on one or more previous trips) during a trip that each power level/velocity combination along the horizontal axes is demanded.

A power split ratio strategy based on instant demanded power and instant velocity may be defined by a function given by the formula:

$$p_e = p_D$$

for $$p_D \leq x \cdot p_b$$

$$p_e = l \cdot p_b$$

for $$p_D > x \cdot p_b \ \& \ v \leq y \cdot v_b$$

$$p_e = h \cdot p_b$$

for $$p_D > x \cdot p_b \ \& \ v > y \cdot v_b$$

where $p_D$ is an input representing an instant demanded power for vehicle 100 (e.g., based on driver actuation of accelerator 118 and/or other power demands), v is an input representing an instant velocity of vehicle 100, $p_e$ is an output representing power delivered by electric motor 104, $p_b$ is an arbitrary unit of power, and $v_b$ is an arbitrary unit of velocity. Regions of operation of the function are shown on the right side of FIG. 5. To set a power split ratio strategy, controller 114 and/or other components of vehicle 100 may determine the values of x, y, l, and h, which may be determined based on the remaining state of charge of energy storage device 102. For a given value of each of x, y, l, and h and a given histogram such as that depicted in FIG. 5, the energy expected to be consumed for a trip may be given by:

$$E = \left( P_{min} \cdot \sum_{i=0}^{M} \sum_{j=0}^{N} T_{i,j} \right) + \left( \sum_{i=0}^{x} i \cdot P_b \cdot \sum_{j=0}^{N} T_i, j \right) +$$

$$\left( l \cdot P_b \cdot \sum_{i=x+1}^{M} \sum_{j=0}^{y} T_{i,j} \right) + \left( h \cdot P_b \cdot \sum_{i=x+1}^{M} \sum_{j=y+1}^{N} T_{i,j} \right)$$

where $T_{i,j}$ is the total time interval (e.g., the magnitude in the histogram) for the demanded power $i \cdot p_b$ and velocity $j \cdot v_b$, M is the magnitude of maximum demanded power, and N is the magnitude of maximum velocity. The feasible set of the values of x, y, l and h depends on the remaining battery energy and may meet the following inequality:

$$(x, y, l, h) \in F(x, y, l, h) \text{ such that}$$

$$\left( P_{min} \cdot \sum_{i=0}^{M} \sum_{j=0}^{N} T_{i,j} \right) + \left( \sum_{i=0}^{x} i \cdot P_b \cdot \sum_{j=0}^{N} T_i, j \right) +$$

-continued $$\left(l \cdot P_b \cdot \sum_{i=x+1}^{M} \sum_{j=0}^{y} T_{i,j}\right) + \left(h \cdot P_b \cdot \sum_{i=x+1}^{M} \sum_{j=y+1}^{N} T_{i,j}\right) < SOC$$

and $x \geq l$ and $x \geq h$

A strategy to determine the values of x, y, l and h may be to select the combination from the feasible set so as to generate power most from electric motor 104, as given by:

$$(x, y, l, h) = \sup_{(x,y,l,h) \in F(x,y,l,h)} \left(P_{min} \cdot \sum_{i=0}^{M} \sum_{j=0}^{N} T_{i,j} + \right.$$

$$\left. \left(\sum_{i=0}^{x} i \cdot P_b \cdot \sum_{j=0}^{N} T_i, j\right) + \left(l \cdot P_b \cdot \sum_{i=x+1}^{M} \sum_{j=0}^{y} T_{i,j}\right) + \left(h \cdot P_b \cdot \sum_{i=x+1}^{M} \sum_{j=y+1}^{N} T_{i,j}\right)\right)$$

Returning again to FIG. 3, in step C, controller 114 and/or another component of vehicle 100 may, from time to time after a vehicle 100 has started a trip, dynamically adjust power split ratio strategy (e.g., alter values of x, y, l, and/or h in the equations set forth above) based on results of the present trip. At sub-step 332, controller 114 and/or other components of vehicle 100 may periodically sample and record information (e.g., store to memory 116) regarding a present trip (e.g., vehicle velocity, demanded power, power delivered from electric motor, power delivered from internal combustion engine, vehicle location, time, etc.). During each sampling interval, vehicle 100 may not only record trip information but may also compute statistics related to the trip, such as, for example, histograms for various parameters during a particular sampling period (e.g., current sampling period).

At sub-step 334, after completing a segment of a trip, controller 114 and/or other components of vehicle 100 may compare current trip information for such segment against historical trip information (e.g., historical trip information retrieved at sub-step 318) for such segment. As used herein, "segment" may include any unit of measure of a trip, including a particular fixed distance or fixed time, or individual portions of a route defined by landmarks or other features (e.g., traffic lights, stop signs, intersections, etc.). During sub-step 334, controller 114 and/or other components of vehicle 100 may determine whether a current location of vehicle 100 is within a particular tolerance range from its expected route. If vehicle 100 is outside of the tolerance range, a different route may be selected and step B may be repeated for the newly-selected route.

At sub-step 336, the power split ratio strategy (e.g., selected values of x, y, l, and h from the equations above) may be adjusted or fine tuned based at least on current trip information and historical trip information. For example, a route R may be composed of P segments such that R={S$_1$|S$_2$, . . . , S$_i$|S$_{i+1}$, . . . , S$_P$}. H[S$_i$] and H[S$_i$] may represent histograms of a segment i in the current trip and historical trips, respectively. After completion of a segment i, a power split ratio strategy for a subsequent segment i+1 may be based at least on the difference between current trip information and historical trip information for the segment i, historical trip information of the remaining route H[R$_{i+1}$], where R$_{i+1}$={S$_{i+1}$, . . . , S$_P$}, and a current state of charge for energy storage device 102. Or stated another way:

$$PSR_{i+1} = \text{Function}(H[S_i] - H[S_i] + H[R_{i+1}], SOC_i),$$

where SOC$_i$ is the state of charge level after completion of segment i. Power split ratio strategy may again be determined as in step B, and the search space of variables to set the strategy (x, y, l, h) may be reduced. In some embodiments, such search space may be limited to values for variables within certain tolerances of then-present values.

Sub-steps 334 and 336 may repeat for the duration of a trip.

Although FIG. 3 discloses a particular number of steps and sub-steps to be taken with respect to method 300, method 300 may be executed with greater or lesser steps and sub-steps than those depicted in FIG. 3. In addition, although FIG. 3 discloses a certain order of steps to be taken with respect to method 300, the steps and sub-steps comprising method 300 may be completed in any suitable order.

Method 300 may be implemented using controller 114 and/or or any other system, device, or apparatus operable to implement method 300. In certain embodiments, method 300 may be implemented partially or fully in software and/or firmware embodied in computer-readable media.

Figure 6:
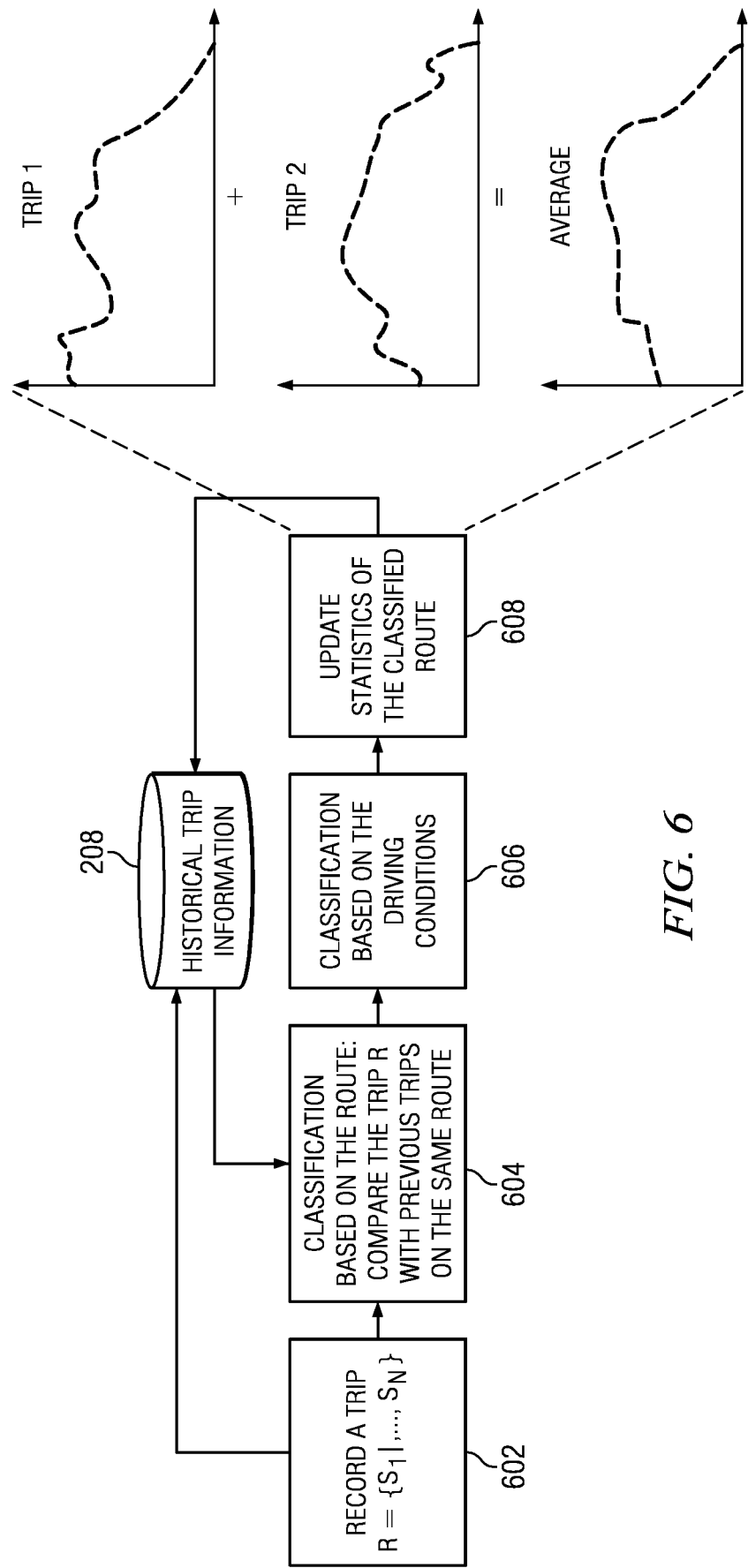
FIG. 6 illustrates a flow chart of an example method of classifying trip information, in accordance with embodiments of the present disclosure.

FIG. 6 illustrates a flow chart of an example method 600 of classifying trip information, in accordance with embodiments of the present disclosure. Method 600 may be performed at least in part by controller 114, and/or one or more other components vehicle 100. According to one embodiment, method 600 may comprise steps 602-608. As noted above, teachings of the present disclosure may be implemented in a variety of configurations of vehicle 100. As such, the preferred initialization point for method 600 and the order of the steps 602-608 comprising method 600 may depend on the implementation chosen.

At step 602, controller 114 and/or other components of vehicle 100 may record various information related to a trip. At step 604, controller 114 and/or other components of vehicle 100 may classify the trip based on its route by comparing the trip with previous trips on the same route. At step 606, controller 114 and/or other components of vehicle 100 may classify the trip based on driving conditions (e.g., traffic congestion, time of day, day of week, average driving speed, etc.). For example, if classification is based on average driving speed, the average driving speed of P segments may be measured. By comparing a vector of current measured speeds and templates of vectors for classified trips, a template closest to the current trip may be found. When the variance in a group of classified trips exceed to certain threshold, reclassification may be performed (e.g., by k-mean clustering). Classification may also be based on more detailed measurements, such as histograms for all segments of the trip based on demanded power, velocities, and/or other factors. Furthermore, when a trip is classified, power demand not relevant to the drive train system of vehicle 100 (e.g., air conditioning, entertainment systems) may be filtered out to provide more precise classification.

At step 608, controller 114 and/or other components of vehicle 100 may update historical trip information 208 based on the most recent trip (e.g., by computing the average of one or more histograms). After step 608, method 600 may end.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order.

Method 600 may be implemented using controller 114 and/or or any other system, device, or apparatus operable to implement method 600. In certain embodiments, method 600 may be implemented partially or fully in software and/or firmware embodied in computer-readable media.

A component of vehicle 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Herein, "each" refers to each member of a set or each member of a subset of a set.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A vehicle comprising:
   an electric motor powered from an energy storage device and configured to convert electrical energy to mechanical energy for driving one or more components of the vehicle;
   an engine configured to convert chemical energy to mechanical energy for driving one or more components of the vehicle; and
   a controller configured to:
      record trip information associated with the vehicle, the trip information including parameters associated with previous trips taken by the vehicle;
      automatically determine a classification of a present trip of the vehicle based on one or more conditions for the trip;
      retrieve trip information for previous trips taken by the vehicle under the one or more conditions based at least on the classification; and
      based at least on the retrieved trip information and a state of charge of the energy storage device, determine a first portion of power to be delivered by the electric motor and a second portion of power to be delivered by the engine.

2. A vehicle according to claim 1, the one or more conditions comprising at least one of a time of day and a day of week.

3. The vehicle according to claim 1, wherein the one or more conditions comprise traffic conditions based on real-time traffic information.

4. The vehicle according to claim 1, the controller further configured to determine the first portion and the second portion based at least on the trip information, the state of charge, and at least one other parameter.

5. The vehicle according to claim 4, further comprising, wherein the at least one other parameter comprises at least one of a current vehicle velocity and the demanded power.

6. The vehicle according to claim 4, wherein the at least one other parameter comprises an amount of fuel remaining in the vehicle.

7. The vehicle according to claim 4, wherein the at least one other parameter comprises at least one of a location of at least one recharging facility for the energy storage device and a cost associated with recharging at a recharging facility.

8. The vehicle according to claim 1, the controller further configured to determine the first portion and the second portion based at least on the trip information, the state of charge, and present trip information, wherein the present information includes parameters associated with a present trip of the vehicle.

9. The vehicle according to claim 1, the controller further configured to determine the first portion and the second portion based at least on the difference between the trip information for a recently completed segment of the trip and present trip information for the recently completed segment, the state of charge, and the trip information for a remaining portion of a trip.

10. A method comprising:
    recording trip information associated with a vehicle, the trip information including parameters associated with previous trips taken by the vehicle;
    automatically determining a classification, by a processor of the vehicle, a present trip of the vehicle based on one or more conditions for the trip;
    retrieving, by the processor of the vehicle, trip information for previous trips taken by the vehicle under the one or more conditions based at least on the classification; and
    determining, by the processor of the vehicle, a first portion of power to be delivered by an electric motor and a second portion of power to be delivered by an engine based at least on the retrieved trip information and a state of charge of an energy storage device configured to provide electrical energy to the electric motor, the electric motor configured to convert electrical energy to mechanical energy for driving one or more components of the vehicle and the engine configured to convert chemical energy to mechanical energy for driving one or more components of the vehicle.

11. The method according to claim 10, the one or more conditions comprising at least one of a time of day and a day of week.

12. The method according to claim 10, wherein the one or more conditions comprise traffic conditions based on real-time traffic information.

13. The method according to claim 10, further comprising determining the first portion and the second portion based at least on the trip information, the state of charge, and at least one other parameter.

14. The method according to claim 13, wherein the at least one other parameter comprises at least one of a current vehicle velocity and the demanded power.

15. The method according to claim 13, wherein the at least one other parameter comprises an amount of fuel remaining in the vehicle.

16. The method according to claim 13, wherein the at least one other parameter comprises at least one of a location of at least one recharging facility for the energy storage device and a cost associated with recharging at a recharging facility.

17. The method according to claim 10, further comprising determining the first portion and the second portion based at least on the trip information, the state of charge, and present trip information, wherein the present information includes parameters associated with a present trip of the vehicle.

18. The method according to claim 10, further comprising determining the first portion and the second portion based at least on the difference between the trip information for a recently completed segment of the trip and present trip information for the recently completed segment, the state of charge, and the trip information for a remaining portion of a trip.

19. The method according to claim 10, further comprising delivering the determined first portion of power using the electric motor.

* * * * *